Feb. 9, 1965     M. M. LAYTON ETAL     3,169,216
CAPACITOR WITH COMPOSITE LEADS OF DIFFERENT METALS
Filed May 5, 1959
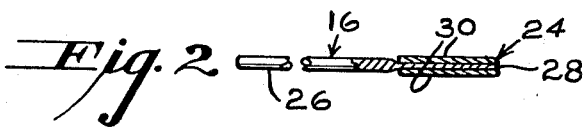
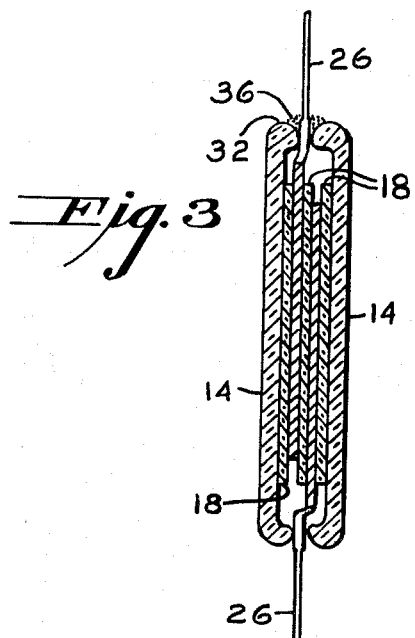
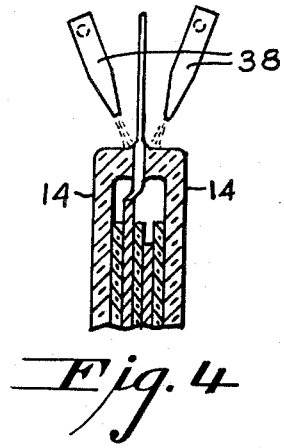
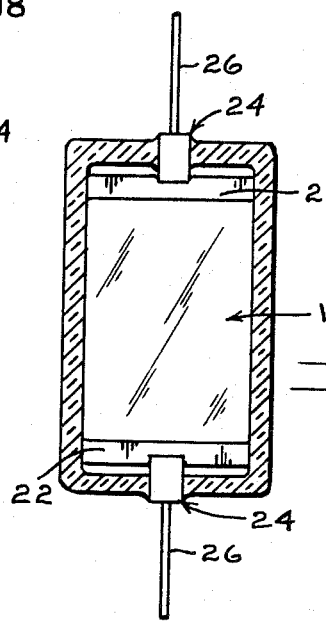
INVENTORS
MARGARET M. LAYTON,
ROBERT B. RANDELS
AND GEORGE F. STOCKDALE
BY Clarence R. Patty, J.
ATTORNEY

United States Patent Office 3,169,216
Patented Feb. 9, 1965

3,169,216
CAPACITOR WITH COMPOSITE LEADS OF DIFFERENT METALS
Margaret M. Layton, Corning, Robert B. Randels, Painted Post, and George F. Stockdale, Corning, N.Y., assignors to Corning Glass Works, Corning, N.Y., a corporation of New York
Filed May 5, 1959, Ser. No. 811,186
5 Claims. (Cl. 317—261)

This invention relates generally to electrical capacitors of the type described in U.S. Patent No. 2,696,577, issued to G. P. Smith. It is particularly concerned with improvements in capacitor encapsulation and electrical lead design to provide a hermetically encapsulated capacitor.

In the glass capacitor of the Smith patent, thin strips of glass are employed as dielectric material and are interleaved with metal foil electrodes to form a stack. The stack is encased between shaped glass covers, and the entire assembly consolidated by application of heat and pressure to produce a glass encapsulated glass capacitor.

Such capacitors provide superior electrical properties and a compact integral construction well adapted to miniaturized electrical systems. Experience has demonstrated, however, that utilization under certain environmental conditions requires a combination of properties which has heretofore appeared incompatible. Among these properties are relatively flexible electrical leads, a high Q value in addition to other electrical characteristics, and means for excluding moisture from the encapsulated capacitor.

Flexible electrical leads facilitate assembly of capacitors into electrical systems and minimize transmission of stress to the fragile capacitor element and encapsulation. However, the conventional flexible wire materials, brass and copper, have thermal coefficients of expansion much higher than ordinary glasses. Adhesion of the cover glass to such a wire lead during the consolidation step causes stresses to develop on cooling. These stresses result in glass fracture, and it has, therefore, been considered necessary to avoid such adhesion in producing glass encased capacitors in accordance with the Smith patent.

Under conditions of high humidity, salt water spray and the like, moisture enters the capacitor assembly along the lead wire. This has been found to promote an electrochemical reaction at the terminal junction which results in failure of the capacitor. Organic sealants have failed to provide a complete barrier to such moisture entry.

Among the various electrical characteristics of capacitors, prescribed in terms of minimal limits by specifications such as military specification MIL-C-11272A, is the capacitor Q value. As is well known, this value is a dimensionless figure of merit for capacitors that varies inversely with the resistance imparted by various capacitor assembly components. It is numerically equal to the ratio of reactance to resistance and may also be expressed as the reciprocal of the dissipation factor.

In glass capacitors, optimum Q values are obtained by producing the glass dielectric film and the encapsulating covers from a glass of the type disclosed in U.S. Patent No. 2,527,693, issued to W. H. Armistead. These glasses have coefficients of expansion on the order of 100–105 $\times 10^{-7}$ cm./cm./° C. It is known that several ferrous alloys possess coefficients of thermal expansion sufficiently close to that of such a glass to permit a fusion seal between the glass and wires produced from these alloys. In attempting to use lead wires produced from such alloys, however, it was found that the ultimate capacitor Q values were prohibitively low except as the wires were of such large diameter as to be essentially inflexible.

It is a primary purpose of this invention to provide an improved capacitor construction whereby these problems are avoided and the described requirements are fulfilled. A further purpose is to provide a hermetically encapsulated capacitor. Another purpose is to provide an improved electrical lead for encapsulated capacitors. A more specific purpose is to provide a glass encapsulated capacitor having a strong, crack-resistant construction and a fusion seal between the electrical leads of the capacitor and the glass encapsulation.

The present invention provides a hermetically encapsulated capacitor comprising a capacitor element composed of electrodes separated by dielectric material, electrically conducting leads attached to the electrodes and extending outwardly through a glass casing that encapsulates the element, each such lead being composed of a relatively inflexible portion, such portion being attached to an electrode and fusion sealed into the glass casing and having an effective thermal coefficient of expansion matching that of the glass, and a flexible second portion which is integrally attached to said first portion but wholly external of the glass casing.

The invention is hereafter described with specific reference to a glass capacitor and in conjunction with the accompanying drawing in which:

FIG. 1 is an exploded sectional view of a glass capacitor assembly,

FIG. 2 is an enlarged, partly in section, view of an electrical lead of FIG. 1,

FIG. 3 is an elevational view in section showing the assembly of FIG. 1 in consolidated form, FIG. 4 is a fragmentary elevational view in section of the capacitor assembly of FIG. 3 and illustrating the formation of a fusion seal in accordance with the present invention, and FIG. 5 is a side view, partly in section, of a capacitor encapsulated in accordance with the invention.

The capacitor assembly of FIG. 1 includes a capacitor element 12, opposed glass covers 14—14 and composite electrical leads 16—16. Except for leads 16, the components of the capacitor may be formed and assembled in accordance with procedures set forth in the earlier mentioned Smith patent and prior patents there referred to. Details, not repeated here, are incorporated from such patents by reference.

Capacitor element 12 is composed of thin layers of glass 18 interleaved with metal foils 20. The latter are alternately offset to provide terminal portions 22 extending beyond the glass. Additional layers of metal foil and glass may be provided if desired for additional capacitance. Glass covers 14 are arranged in opposed relationship to enclose capacitor element 12, with shaped lateral edges overlying the leads as taught by the Smith patent. The assembly is shown in exploded form, and dimensions are somewhat exaggerated and distorted, in order to better portray the arranged components.

Composite lead members 16 constitute a key feature of this invention and, as shown in exaggerated form in FIG. 2, are composed of two distinct, but integral, portions, flag member 24 and wire member 26. Flag 24 is a small rectangular piece of metal on the order of 20–35 mils thick and may, for example, have ⅛ inch by ¼ inch sides, the actual size being suitably proportioned to other capacitor components. It is composed of a base material 28, which may be a suitable ferrous alloy such as 430 Ti stainless steel or an iron-nickel alloy, and surface layers 30 having a thickness of 1–2 mils, the surface layer being composed of a high conductivity metal such as copper applied by cladding or plating methods.

The flags are conveniently cut from a large strip or sheet of copper clad metal, thus providing unclad side sections. A base metal or alloy is selected to provide thermal expansion characteristics compatible with glass materials to which it is subsequently sealed. The copper clad has no apparent effect in this respect presumably because there are unclad surfaces on the flag member. A 52% nickel-48% iron alloy is preferred for use with glasses having an expansion of $100$–$105 \times 10^{-7}$ cm./cm./° C. since it provides an expansion match and is easily clad with copper.

The clad or plated surface layer is required to provide a low resistivity path for electrical current flow between electrodes 22 and wire member 26. Without the clad layer, capacitor Q values are rendered prohibitively low by the higher resistivity of the base alloy required for sealing purposes. The wire portion 26 of lead 16 may be of any conventional flexible material, such as brass, copper or silver, that is capable of being welded or otherwise integrally united to flag 24. Wire member 26 of lead 16 may be butt welded to flag portion 24 on an unclad surface. In assembling a capacitor, lead 16 is arranged with the copper clad surfaces 30 of flag portion 24 facing the overlying edge portions of glass covers 14 and with one such clad surface electrically connected, as by welding, to electrode terminal 22.

The components shown in FIG. 1 are assembled in accordance with known glass capacitor practice and consolidated into an integral unit by passing the assembly through pressure rolls while heated to a temperature corresponding to the softening point of the glass which may be on the order of 500° C. At this temperature, the glass components soften sufficiently to adhere to each other and to the metal foils under the influence of pressure. However, no appreciable flow of glass occurs during this operation as may be seen from FIG. 3 where glass covers 14 are shown adhered to each other, but with their rounded edges 32 substantially unchanged. At higher temperatures, where adequate glass flow for complete sealing would occur, the component layers forming capacitor element 12 would be distorted and damaged. Accordingly, the capacitor will not be a hermetically sealed unit at this stage.

The fused hermetic seal which characterizes the present invention is provided in a separate sealing operation illustratively shown in FIG. 4. As shown in FIG. 3, there is in the consolidated and encapsulated capacitor a groove intermediate the rounded edges of glass covers 14. In hermetically sealing the capacitor, this groove is filled with a soft sealing glass 36 which has a sufficiently low viscosity at temperatures on the order of 450° C. or less to form a fused seal. Sealing glass 36 may be a well known soft sealing glass, such as a lead borate glass, whose expansion will match with the expansion of the capacitor glass and flag 24. The sealing glass may be flowed in molten form into the groove. More conveniently, however, it is powdered and applied in the groove in a suspension which is then dried and fused as schematically shown in FIG. 4.

The fragmentary showing of FIG. 4 corresponds to the upper portion of the capacitor of FIG. 3 with sealing glass 36 fused to fill in the groove and provide a smooth composite glass surface. As schematically shown, heat is applied locally, as by heating units 38 to fuse, a sealing glass 36 and cause it to flow and fill the groove. The amount of sealing glass employed and the arrangement of lead 16 should be such that the sealing glass does not contact wire portion 26 of the composite lead member. Flag portion 24 will be imbedded in sealing glass 36, but may extend slightly above the sealing glass surface. It is the function of sealing glass 36 to completely fill the groove or valley between glass covers 14 and thereby form a fused hermetic seal between flag portion 24 of lead member 16 and the glass cover members.

In this manner the desired hermetic encapsulation of a capacitor is provided with a fused seal between the electrically conducting lead members and the glass encapsulation. The inflexible portion of the lead member provides the necessary expansion match for sealing to the glass encapsulation, while being embedded within the glass where flexibility is immaterial. The flexible portion is out of contact with the sealing glass but provides the desired flexibility so that stresses are not transmitted into the glass encapsulation of the capacitor. Furthermore the Q value of the capacitor is maintained at the desired high values attained with prior unsealed constructions.

While the invention has been described with reference to a specific glass capacitor element, it will be understood that various modifications are possible within the scope of the invention. In particular, ceramic materials other than glass may be employed as dielectric in the capacitor element, and the element may alternatively be assembled by known metallizing procedures.

What is claimed is:

1. A glass encapsulated capacitor comprising a capacitor element composed of electrodes separated by dielectric material and electrically conducting leads attached to the electrodes and extending outwardly through the glass encapsulation, each lead being a composite member composed of two distinct parts, one part being a metal that is essentially rigid, attached to the electrodes and fusion sealed directly to the encapsulating glass, and the second part being composed of a different metal that is flexible and integrally attached to the first part external of the glass encapsulation.

2. A capacitor in accordance with claim 1 wherein the electrodes are composed of metal foils, the dielectric material is in the form of thin glass strips, and the glass casing is integrally united with the capacitor element.

3. A capacitor in accordance with claim 1 wherein the first portion of the electrical lead is composed of a ferrous alloy having a thin layer of a high electrical conductivity metal on at least one of its upper and lower surfaces.

4. A capacitor in accordance with claim 3 wherein the high conductivity metal is copper.

5. A capacitor in accordance with claim 1 wherein the fusion sealed, first portion of the electrical lead is in the form of a rectangular flag of relatively large cross section and the outer, second portion is in the form of a wire.

References Cited in the file of this patent

UNITED STATES PATENTS

| | | |
|---|---|---|
| 2,413,539 | Ballard | Dec. 31, 1946 |
| 2,502,310 | Chapman | Mar. 28, 1950 |
| 2,552,653 | Stupakoff | May 15, 1951 |
| 2,585,752 | Dorst | Feb. 12, 1952 |
| 2,696,577 | Smith | Dec. 7, 1954 |
| 2,750,657 | Herbert | June 19, 1956 |
| 2,825,040 | Dorsey | Feb. 25, 1958 |
| 2,921,113 | Clemons | Jan. 12, 1960 |

FOREIGN PATENTS

| | | |
|---|---|---|
| 482,053 | Great Britain | Mar. 23, 1938 |
| 574,501 | Great Britain | Jan. 8, 1946 |
| 585,474 | Great Britain | Feb. 7, 1947 |
| 785,625 | Great Britain | Oct. 30, 1957 |